United States Patent
Gu et al.

(10) Patent No.: US 10,018,799 B2
(45) Date of Patent: Jul. 10, 2018

(54) OPTICAL BRIDGE BETWEEN EXTERIOR AND INTERIOR NETWORKS

(71) Applicant: Google Inc., Mountian View, CA (US)

(72) Inventors: Changzhan Gu, Milpitas, CA (US); Changhong Joy Jiang, Dublin, CA (US); Zhibin Zhang, Hayward, CA (US); Jian Ho, Santa Clara, CA (US)

(73) Assignee: Google LLC, Tokyo (JP)

( * ) Notice: Subject to any disclaimer, the term of this patent is extended or adjusted under 35 U.S.C. 154(b) by 0 days.

(21) Appl. No.: 15/371,577

(22) Filed: Dec. 7, 2016

(65) Prior Publication Data
US 2018/0157001 A1    Jun. 7, 2018

(51) Int. Cl.
| | |
|---|---|
| *H04B 10/00* | (2013.01) |
| *G02B 6/44* | (2006.01) |
| *H04B 10/25* | (2013.01) |
| *H04B 10/27* | (2013.01) |
| *H04B 10/11* | (2013.01) |
| *G02B 6/32* | (2006.01) |

(52) U.S. Cl.
CPC .............. *G02B 6/4466* (2013.01); *G02B 6/32* (2013.01); *H04B 10/11* (2013.01); *H04B 10/25* (2013.01); *H04B 10/27* (2013.01)

(58) Field of Classification Search
CPC ........ G02B 6/4466; G02B 6/32; H04B 10/11; H04B 10/25; H04B 10/27
USPC ......................................................... 398/116
See application file for complete search history.

(56) References Cited

U.S. PATENT DOCUMENTS

| | | | |
|---|---|---|---|
| 7,366,150 B2 | 4/2008 | Lee et al. | |
| 7,378,817 B2 | 5/2008 | Calhoon et al. | |
| 9,787,400 B2 * | 10/2017 | Bourg | H04B 10/27 |
| 2002/0131123 A1 | 9/2002 | Clark | |
| 2002/0171897 A1 | 11/2002 | Cho et al. | |

(Continued)

FOREIGN PATENT DOCUMENTS

| | | |
|---|---|---|
| DE | 102010012782 A1 | 9/2011 |
| JP | S57166750 A | 10/1982 |

(Continued)

OTHER PUBLICATIONS

International Search Report and Written Opinion for the Application No. PCT/US2017/052425 dated Jan. 4, 2018.

*Primary Examiner* — Juan A Torres
(74) *Attorney, Agent, or Firm* — Honigman Miller Schwartz and Cohn LLP

(57) ABSTRACT

A method includes receiving an optical signal from an external network at a first optical terminal affixed to an external side of a substantially transparent surface of a building. The first optical terminal includes a first fiber port configured to receive a first optical fiber and an output lens optically coupled to the first fiber port. The first fiber port is configured to route the optical signal from the external network to first optical terminal. The method also includes directing the optical signal through an optical link extending through the substantially transparent surface to a second optical terminal affixed to an interior side of the substantially transparent surface. The second optical terminal includes an input lens and a second fiber port optically coupled to the input lens. The input lens is configured to receive the optical signal from the first optical terminal through the optical link.

30 Claims, 6 Drawing Sheets

(56) References Cited

U.S. PATENT DOCUMENTS

| | | | |
|---|---|---|---|
| 2009/0060530 A1 | 3/2009 | Biegert et al. | |
| 2015/0026909 A1* | 1/2015 | Baek | A47L 1/03 15/250.11 |
| 2016/0099749 A1 | 4/2016 | Bennett et al. | |
| 2016/0301474 A1 | 10/2016 | Bourg et al. | |
| 2017/0195054 A1* | 7/2017 | Ashrafi | H04B 10/40 |

FOREIGN PATENT DOCUMENTS

| | | |
|---|---|---|
| JP | S62197108 U | 12/1987 |
| JP | 2004080595 A | 3/2004 |
| JP | 2007259179 A | 10/2007 |
| JP | 2008109598 A | 5/2008 |
| WO | WO-2002056508 A1 | 7/2002 |
| WO | WO-2003058850 A2 | 7/2003 |

* cited by examiner

OPTICAL BRIDGE BETWEEN EXTERIOR AND INTERIOR NETWORKS

TECHNICAL FIELD

This disclosure relates to optical bridges for providing communications between an exterior network and a residential network.

BACKGROUND

Fiber optic communication is an emerging method of transmitting information from a source (transmitter) to a destination (receiver) using optical fibers as the communication channel. A passive optical network (PON) generally includes an optical line terminal located at a service provider central office (e.g., a hub) and a number of optical network units or optical network terminals, near end users. These optical network units/terminals provide a residential network associated with the end user (e.g., subscriber) access to the PON and are typically located at a demarcation point between the residential network and the PON.

Generally, installation of a fiber optical communication system includes physically accessing buildings or premises of the subscribers. Such physical access may entail a technician entering the building, drilling holes through walls, installing and commissioning the fibers and hardware inside the premises, and so forth. Without such physical access, the installers are not able to deploy or maintain the infrastructure and enable the service subscription to the end user. The physical access requirements can lead to higher costs of deployment due to labor, less customer satisfaction, a slower deployment process, and health risks resulting from drilling holes through walls to feed the fibers/cables.

SUMMARY

One aspect of the disclosure provides a method for non-intrusively establishing communication between an external network and a network interface unit of a wireless network located inside a building. The method includes receiving an optical signal from the external network at a first optical terminal affixed to an external side of a substantially transparent surface of the building. The first optical terminal includes a first fiber port configured to receive a first optical fiber and an output lens optically coupled to the first fiber port and defining an optical transmission axis. The first optical fiber is configured to route the optical signal from the external network to the first optical terminal. The method also includes directing, by the output lens of the first optical terminal, the optical signal through an optical link extending through the substantially transparent surface to a second optical terminal affixed to an interior side of the substantially transparent surface. The second optical terminal includes an input lens optically coupled to the output lens of the first optical terminal and configured to receive the optical signal from the first optical terminal through the optical link and a second fiber port optically coupled to the input lens and configured to receive a second optical fiber connecting the second optical terminal to a network interface unit located within the building. The second optical fiber is configured to route the optical signal from the second optical terminal to the network interface unit.

Implementations of the disclosure may include one or more of the following optional features. In some implementations, the input lens defines an optical receiving axis substantially coaxial with the optical transmission axis of the output lens. Receiving the optical signal from the external network may include receiving the optical signal through the first optical fiber from an optical network unit located outside the building at a demarcation point between the building and the external network. The optical network unit may be configured to route the optical signal from an optical line terminal of the external network to the first optical terminal. The optical network unit may receive the optical signal through a fiber optic line terminating at the optical network unit. The fiber optical line may be optically coupled to an optical amplifier configured to pump light into the fiber optic line to amplify the optical signal. In some examples, the optical network unit receives the optical signal via a free space optical beam from a free space optical terminal at an established fiber point of presence site of the external network. The optical network unit may include an optical transceiver configured to transmit the optical signal received from the external network through the first optical fiber to the output lens of the first optical terminal.

In some implementations, prior to directing the optical signal through the optical link, the method may include receiving, at an optical transceiver of the first optical terminal, the optical signal routed through the first optical fiber to the first fiber port and transmitting the optical signal from the optical transceiver to the output lens. The optical transceiver may be optically coupled to the first fiber port and the output lens. The optical transceiver may include a laser or a light emitting diode for transmitting the optical signal to the output lens. The method may also include receiving, at power circuitry of the first optical terminal, inductive power from an internal charging device inductively coupled to the power circuitry. The internal charging device may be located inside the building and include a transmit induction coil configured to generate an electromagnetic field for transmitting the inductive power through the substantially transparent surface to the power circuitry. The internal charging device may be electrically connected to an alternating current power source located inside the building and affixed to the interior side of the substantially transparent surface in a juxtaposed relationship with the external network interface unit.

In some examples, the power circuitry of the first optical terminal includes a receive induction coil configured to receive the inductive power transmitted over the electromagnetic field by the transmit induction coil of the internal charging device and a rectifier configured to convert the inductive power into direct current power for powering an optical transceiver of the first optical terminal and/or powering customer premises equipment located outside the building. The network interface unit may be configured to convert the optical signal received from the second optical terminal into an electrical signal and transmit the data packets through a residential network to an electronic device located inside the building. The electrical signal may contain packets of data from the external network. The network interface unit may use multiple-user multiple-input multiple-output beam forming configured to transmit/receive data packets to and from multiple electronic devices having spatially diverse locations within the building. The substantially transparent surface may include a window. The optical link may include a distance equal to a thickness of the substantially transparent surface.

Another aspect of the disclosure provides a system for non-intrusively establishing communication between an external network and a network interface unit of a wireless network located inside a building. The system includes the network interface unit located within the building, a first optical terminal configured to receive an optical signal from the external network, and a second optical terminal affixed to an interior side of the substantially transparent surface. The first optical terminal includes a first fiber port configured to receive a first optical fiber and an output lens optically coupled to the first fiber port and defining an optical transmission axis. The first optical fiber is configured to route the optical signal from the external network to the first optical terminal. The output lens is configured to direct the optical signal through an optical link extending through the substantially transparent surface. The second optical terminal includes an input lens optically coupled to the output lens of the first optical terminal and configured to receive the optical signal from the first optical terminal through the optical link and a second fiber port optically coupled to the input lens and configured to receive a second optical fiber connecting the second optical terminal to the network interface unit. The second optical fiber is configured to route the optical signal from the second optical terminal to the network interface unit.

This aspect may include one or more of the following optional features. In some implementations, the input lens defines an optical receiving axis substantially coaxial with the optical transmission axis of the output lens. The system may also include an optical network unit located outside the building at a demarcation point between the building and the external network. The optical network unit may be configured to route the optical signal from an optical line terminal of the external network to the first optical terminal. The optical network unit may receive the optical signal through a fiber optic line terminating at the optical network unit.

In some examples, the system includes an optical amplifier optically coupled to the fiber optical line, the optical amplifier configured to pump light into the fiber optic line to amplify the optical signal. The optical network unit may receive the optical signal via a free space optical beam from a free space optical terminal at an established fiber point of presence site of the external network. The optical network unit may also include an optical transceiver configured to transmit the optical signal received from the external network through the first optical fiber to the output lens of the first optical terminal. The first optical terminal may include an optical transceiver optically coupled to the first fiber port and the output lens. The first optical terminal may be configured to receive the optical signal routed through first optical fiber to the first fiber port and transmit the optical signal from the optical transceiver to the output lens.

In some examples, the system includes an internal charging device located inside the building and inductively coupled to power circuitry of the first optical terminal. The internal charging device may include a transmit induction coil configured to generate an electromagnetic field for transmitting inductive power through the substantially transparent surface to the power circuitry. The internal charging device may be electrically connected to an alternating current power source located inside the building and affixed to the interior side of the substantially transparent surface in a juxtaposed relationship with the external network interface unit. In some examples, the power circuitry of the first optical terminal line includes a receive induction coil configured to receive the inductive power transmitted over the electromagnetic field by the transmit induction coil of the internal charging device and a rectifier configured to convert the inductive power into direct current power for powering an optical transceiver of the first optical terminal and/or powering customer premises equipment located outside the building.

In some implementations, the network interface unit is configured to convert the optical signal received from the second optical terminal into an electrical signal and transmit the data packets through a residential network to an electronic device located inside the building. The electrical signal may contain packets of data from the external network. The network interface may further use multiple-user multiple-input multiple-output beam forming configured to transmit/receive data packets to and from multiple electronic devices having spatially diverse locations within the building. The substantially transparent surface may include a window. The optical link may include a distance equal to a thickness of the substantially transparent surface.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
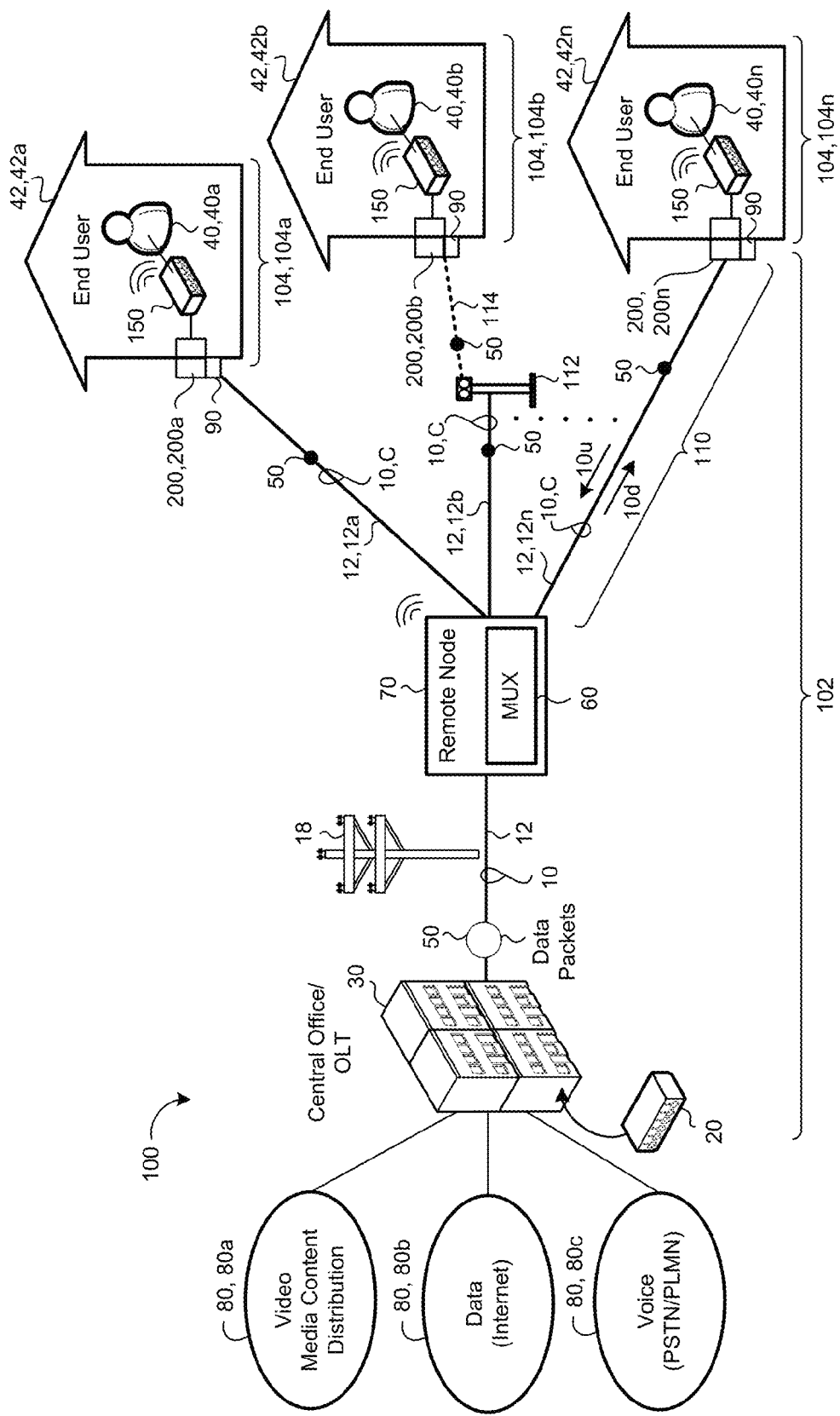
FIGS. 1A and 1B are schematic views of an example network system.

Deploying fiber-to-the-home (FTTH) infrastructures generally requires a technician to gain physical access to a building of a subscriber, which may include, without limitation, a house, apartment, or multi-dwelling unit (MDU). The physical access may include the technician entering the premises to install hardware and drilling holes through building walls to commission fibers to connect the hardware to an optical network of a provider. Implementations herein alleviate the physical access requirement by allowing the subscriber to self-install an optical bridge that permits optical signals to enter the building of the subscriber to penetrate through a substantially transparent surface (e.g., window) of the building, and thereby provide a residential network access to the optical network. The optical bridge includes a first optical terminal affixed to an exterior side of the surface and including an output lens, and a second optical terminal affixed to an interior side of the surface and including an input lens. The first optical terminal receives a downstream optical signal from a demarcation point between the customer premises and the provider network and directs the optical signal through an optical link that extends through the substantially transparent surface (e.g., window) to the second optical terminal located inside the building. Thus, the optical link enables the first optical terminal to wirelessly transmit the optical signal through the window to the second optical terminal. Thereafter, the second optical terminal routes the optical signal to a network interface unit (e.g., network box) that serves as an access point for the residential network by establishing wireless and/or wired connections with electronic devices within the building of the subscriber. In addition to alleviating the physical access requirement, transmission of the optical signal over the wireless optical link through the window permits the residential network to gain access to the optical network without having to convert the optical signal to another form, such as a radio frequency (RF) signal or electrical signal, for transmission through the building. Thus, the high throughput associated with optical communications is maintained between an optical line terminal and a target network interface unit (e.g., network box) located in a subscriber's home/building.

Additionally, optical network units located at the demarcation point may be installed outside the premises. While external power sources (e.g., a weatherproof 120 VAC outlet) may provide power for operating optical network units outside the customer premises, external power sources are not always present, or may be inconveniently located and therefore require the use of long cable runs to provide power thereto. Accordingly, implementations herein may include the first optical terminal, affixed to the exterior of the customer premises, having power circuitry configured to receive inductive power form a charging device located inside the building and providing direct current power for powering components of the optical network unit and/or components (e.g., optical transceiver) of the first optical terminal.

Figure 1B:
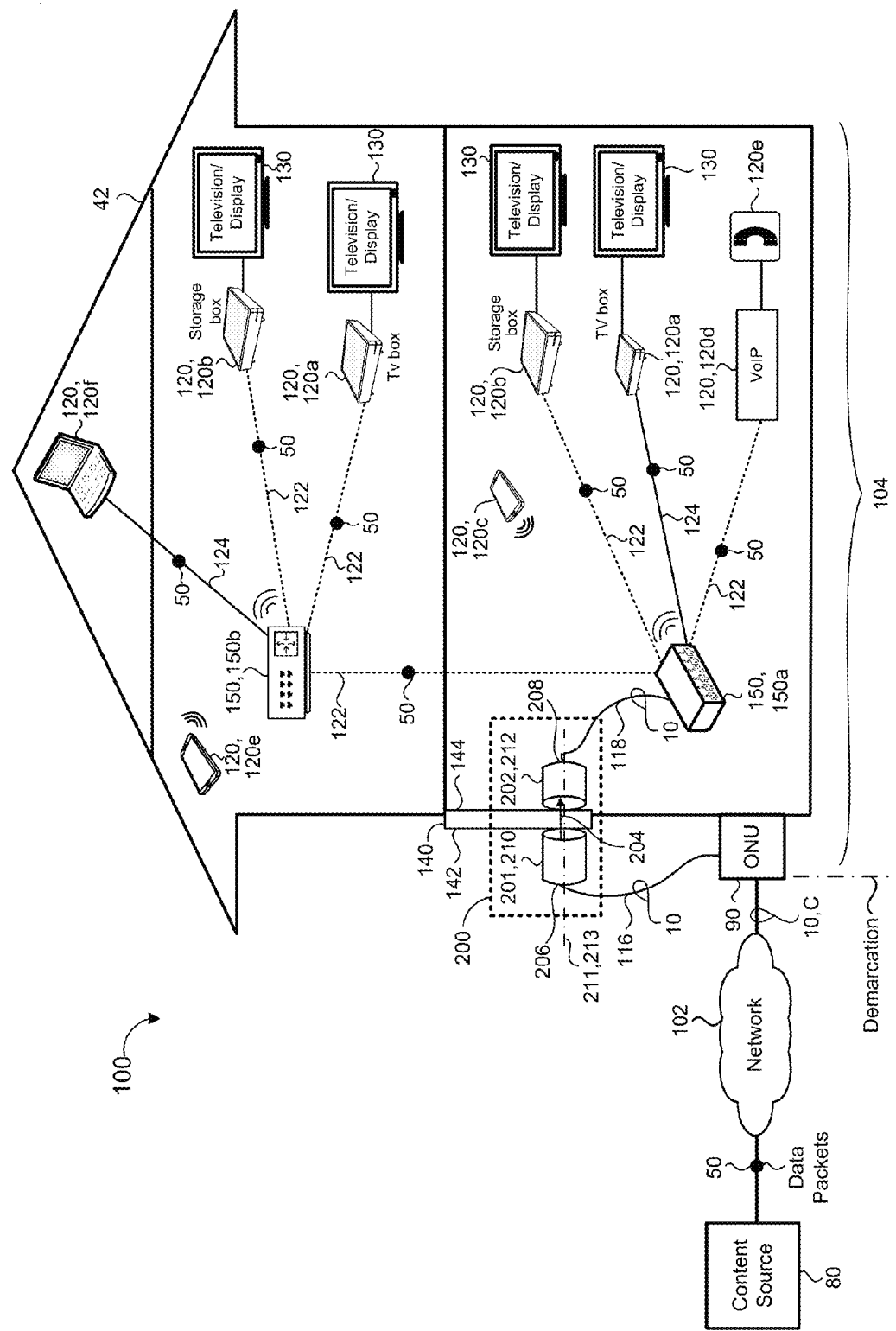

Referring to FIGS. 1A and 1B, in some implementations, a network system 100 includes an access network 102 in communication with one or more residential networks 104, 104a-n. The access network 102 (also referred to as an external network) delivers communication signals 10 (e.g., optical signals) through communication links 12, 12a-n (e.g., optical fibers or line-of-sight free space optical communications) between an optical line terminal (OLT) 20 housed in a central office (CO) 30 to one or more residential networks 104 each associated with a user 40, 40a-n (also referred to as a customer) at a corresponding customer premises 42, 42a-n (e.g., house, building, or structure). The network system 100 may be associated with an optical fiber-to-the-home (FTTH), fiber-to-the-building (FTTB), fiber-to-the-node (FTTN), fiber-to-the-curb (FTTC), fiber-to-the-premises (FTTP), or simply FTTX system for delivering high speed, high bandwidth services for data 50 (e.g., as data packets).

The access network 102 may be an optical network (e.g., a passive optical network (PON) or a Gigabit-capable PON (GPON)) from the OLT 20. The optical network 102 may implement a point-to-point or a point-to-multi-point network architecture that uses a multiplexer/demultiplexer (MUX) 60 at a remote node 70 to enable a single optical fiber feeder 12 to serve multiple users 40 (e.g. 16-128). Although the optical network 102 is described with respect to a PON, an active optical network (AON) may be used as well.

The optical network 102 provides the optical fibers 12 for sending data packets 50 from the CO 30 that includes the OLT 20 (e.g., having at least one optical transmitter/receiver or transceiver) to a number of optical network units/terminals (ONUs) 90 (e.g., bi-directional optical transceiver) associated with the users 40. The OLT 20 may be external to the CO 30, where the CO 30 feeds the OLT 20 using dedicated fiber runs. The CO 30 receives data 50 from a content source 80, such as video media distribution 80a, internet data source 80b, and voice data source 80c, that may be transferred as data packets 50 to the end users 40.

The examples show the OLT 20 as the endpoint of the optical network 102 by converting electrical signals used by equipment of a service provider to/from fiber-optic signals 10 used by the optical network 102. In addition, the OLT 20 coordinates multiplexing between conversion devices at the user end 40. The OLT 20 sends the optical signal 10 through a feeder fiber 12 to the remote node 70, which multiplexes/demultiplexes the optical signal 10, via the MUX 60, for distribution between the OLT 20 and the ONUs 90 associated with the end users 40, 40a-n. In some implementations, power lines 18, such as 110 VAC electric lines or from commonly available Cable Television (CATV) power supply lines, route the optical fibers 12 and provide power.

In some examples, the optical fiber 12 providing a last-run portion 110, also known as the "last mile" (e.g., curb-to-home) or last-run link, may include a free space optical (FSO) terminal 112 at an established fiber point-of-presence (POP) site for wirelessly distributing the data packets 50 to the customer premises 42. For instance, the FSO terminal 112 may receive the optical signal 10 via the corresponding optical fiber 12b from the OLT 20 and transmit the optical signal 10 in an FSO beam 114 containing the data packets 50 to the ONU 90 at the premises 42. In some examples, the FSO terminal 112 uses multi-Gigabit connectivity to transmit/receive FSO beams 114 to and from the corresponding ONU 90. Under these scenarios, the ONU 90 includes one or more antennas capable of operating in a receive mode for receiving the FSO beam 114 from the FSO terminal 112.

The ONUs 90 are installed outside the premises 42 of the user 40 and include any type of signal conductor capable of directing downstream and upstream optical signals 10 between the optical network 102 and the residential network 104. Each ONU 90 may include an optical transmitter/receiver (i.e., transceiver) for transmitting and receiving optical signals 10 to and from the OLT 20. For instance, the ONU 90 receives downstream optical signals 10 from the OLT 20 through the optical fiber 12 (or FSO beam 114) and routes the downstream optical signals 10 through a first residential optical fiber 116 connecting the ONU 90 to an optical bridge 200, 200a-n. Each building includes a corresponding optical bridge 200 having a pair of optically coupled optical terminals 201, 202 configured to route optical signals 10 into and out of the building 42 over a wireless optical link 204 that penetrates a substantially transparent surface 140 of the building 42. The optical bridge 200 serves as a bridge for wirelessly communicating optical signals 10 between the optical network 102 and the residential network 104 without requiring the use of physical optical fibers penetrating (i.e., via drilling holes) through the structure of the building 42. Additionally, the optical bridge 200 delivers an optical signal 10 from the OLT 20 to a network interface unit (NIU) 150 (e.g., network box) within the building without having to convert the optical signal 10 into other forms (e.g., radio frequency signal or electrical signal) prior to the network interface unit 150 receiving the optical signal 10. For instance, the optical bridge 200 routes the optical signal 10 to the NIU 150 through a second residential optical fiber 118 connecting the optical bridge 200 to the NIU 150.

Customer premises equipment (CPE) is any terminal and associated equipment located at the premises (e.g., building) 42 of the user 40 and connected to a carrier telecommunication channel C at a demarcation point. In the examples shown, the ONU 90, the optical bridge 200, and the NIU 150 are CPEs. The demarcation point is established at a house, building, or complex to separate the customer equipment from the service provider equipment. CPE generally refers to devices such as telephones, routers, switches, residential gateways (RG), set-top boxes, fixed mobile convergence products, home networking adapters, or Internet access gateways that enable the user 40 to access services of a communications service provider and distribute them around the building 42 of the user 40 via the residential network 104.

In some examples, the NIU 150 of the residential network 104 includes a network box equipped with multiple Internet protocol (IP) interfaces. Each building 42 may include one or more NIUs 150, 150a-b. Each NIU 150 acts as an access point (e.g., wireless or wired connection) for the residential network 104, for example, by offering Wireless Fidelity (Wi-Fi) connectivity (e.g., wireless communication links 122 (FIG. 1B)) to the residential network 104 and/or by offering multiple wired connections 124 (FIG. 1B) capable of establishing connections with electronic devices 120. Therefore, the NIU 150 (e.g., network box) serves as a router or wireless extender/repeater to provide internet service to the devices 120 located within the premises 42 (e.g., building, house, office, etc.). In the example shown, a first NIU 150a implements a media converter that converts the fiber-optic light signal 10 received from the optical bridge 200 via the second residential optical fiber 118 to an electrical signal containing the data packets 50 for transmission through the residential network 104 to one or more electronic devices 120.

In some implementations, the residential network 104 uses standard communications technologies and/or protocols. Thus, the network 104 can include links using technologies, such as Ethernet, Wireless Fidelity (Wi-Fi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 104 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 104 can be represented using technologies and/or formats including the hypertext markup language (HTML), the extensible markup language (XML), etc. In addition, all or some of the links can be encrypted using conventional encryption technologies, such as secure sockets layer (SSL), transport layer security (TLS), virtual private networks (VPNs), Internet Protocol security (IPsec), etc. In other examples, the network 104 can use custom and/or dedicated data communications technologies instead of, or in addition to, the ones described above.

In some implementations, the residential network 104 is a local area network (LAN) (e.g., a home area network (HAN)) that facilitates communication and interoperability among the optical bridge 200, one or more NIUs 150, 150a-b, and electronic devices 120 within a limited area 42 (e.g., building), such as a home, school, or office of the user 40. An electronic device 120 may be a TV box 120a, a storage box 120b, a tablet 120c, a voice-over-internet protocol (VoIP) device 120d, a phone or smartphone 120e, a computer 120f (or a laptop, a portable electronic device), etc., each of which may be a wireless connection 122 or a wired connection 124 to an internal NIU 150. The wireless connection 122, also referred to as wireless communication link 122, may include a wireless interface, such as an RG-45 Ethernet interface for 802.11 Wireless Fidelity (Wi-Fi). On the other hand wired connection 124 may include a coaxial interface, such as an RJ-45 interface.

In some examples, the NIU 150 uses single-user MIMO (SU-MIMO) beam forming configured to transmit/receive data packets 50 over a dedicated wireless communication link 122 to and from a single electronic 120 at a time. In other examples, the NIU 150 uses multiple-user MIMO (MU-MIMO) beam forming configured to simultaneously transmit/receive data packets 50 over corresponding dedicated wireless communication links 122 to and from multiple electronic devices 120 within the building 42 in spatially diverse locations/positions. Accordingly, each NIU 150 serves as a node within the residential network 104 for routing the data packets 50 to a target electronic device 120 directly or via one or more hops between the optical bridge 200 and the target electronic device 120.

Referring to FIG. 1B, the optical bridge 200 includes the first and second optical terminals 201, 202, respectively, affixed to opposite sides 142, 144 of the substantially transparent surface 140 of the building 42. For instance, the first optical terminal 201 is affixed to the external side 142 of the surface 140 of the building 42 and the second optical terminal 202 is affixed to the interior side 144 of the surface 140 of the building 42. The external side 142 may be referred to as an external surface 142 and the interior side 144 may be referred to as an interior surface 144. The first optical terminal 201 may correspond to an external optical terminal 201 of the optical bridge 200, while the second optical terminal 202 may correspond to an internal optical terminal 202 of the optical bridge 200. In the example shown, the substantially transparent surface 140 includes a window formed from glass. The substantially transparent surface 140 may include any surface/material capable of providing a transmission medium for the wireless optical link 204 to penetrate through between the first optical terminal 201 and the second optical terminal 202.

The first optical terminal 201 of the optical bridge 200 includes a first fiber port 206 configured to receive the first residential optical fiber 116 and an output lens 210 optically coupled to the first fiber port 206 and defining an optical transmission axis 211. The first optical terminal 201 affixes to the external side 142 of the window 140 via one or more of adhesives, suction, magnets, or other attachment techniques.

The first residential optical fiber 116 is configured to route a downstream optical signal 10, 10d from the ONU 90 to the first optical terminal 201. The first residential optical fiber 116 may also route upstream optical signals 10, 10u from the first optical terminal 201 to the ONU 90 for transmission to the optical network 102. In some examples, the first optical terminal 201 receives a downstream optical signal 10, 10d at the first fiber port 206 and the output lens 210 directs the optical signal through the wireless optical link 204 extending (i.e., penetrating) through the surface 140 (e.g., window) to the second optical terminal 202 affixed to the interior side 144 of the surface 140. Accordingly, the first optical terminal 201 is operative as a transmitter terminal for providing downstream optical signals 10 received from the ONU 90 at the demarcation point through the surface 140 via the wireless optical link 204 to the second optical terminal 202 within the building 42. The wireless optical link 204 may define a distance equal to the thickness of the substantially transparent surface 140. For instance, the distance may of the wireless optical link 204 may be within the range from about 0.25 inches to about one (1) inch.

The second optical terminal 202 of the optical bridge 200 includes an input lens 212 optically coupled to the output lens 210 of the first optical terminal 201 and a second fiber 208 port optically coupled to the input lens 212. The input lens 212 is configured to receive the optical signal 10 from the first optical terminal 201 (e.g., from the output lens 210) through the optical link 204 extending through the transmission medium provided by the substantially transparent surface 140. In some examples, the wireless optical link 204 includes a distance equal to a thickness of the substantially transparent surface 140 (e.g., window).

As with the first optical terminal 201, the second optical terminal 202 may affix to the interior side 144 of the window 140 via one or more of adhesives, suction, magnets, or other attachment techniques. The input lens 212 may define an optical receiving axis 213 substantially coaxial with the optical transmission axis 211 of the output lens 210 to provide line-of-sight alignment between the output and input lenses 210, 212 of the first and second optical terminals 201, 202, respectively. In some examples, the user 40 installs the optical bridge 200 by affixing the first optical terminal 201 to the exterior side 142 of the window 140 and affixing the second optical terminal 202 to the interior side 144 of the window 140 after aligning the lenses 210, 212 with one another. In some implementations, the first and second optical terminals 201, 202 affix to a corner of the window 140 to no obstruct a view through the window and/or decrease aesthetic properties of the building 42. In some examples, the first and second optical terminals 201, 202 include magnets and ferromagnetic materials that cooperate that attract with one another to simultaneously provide the line-of-sight alignment between the lenses 210, 212 and affix the terminals 201, 202 to their corresponding sides 142, 144 of the window 140.

The second fiber port 208 is configured to receive the second residential optical fiber 118 connecting the second optical terminal 202 to the first NIU 150a located within the building 42. Thus, second optical terminal 202 is operative as a receiver terminal for receiving the downstream optical signals 10 from the first optical terminal 201 through the wireless optical link 204, and thereafter routing the downstream optical signal 10 via the second residential optical fiber 118 to the first NIU 150a. In some examples, the first NIU 150a converts the received optical signal 10 into an electrical signal for routing data packets 50 through the residential network 104 to one or more electronic devices 120 and/or a second NIU 150b, which may function as a range extender. The TV box 120a (e.g., set top box) and/or the storage box 120b may be in communication with a television/display 130 for viewing content.

Figure 2A:
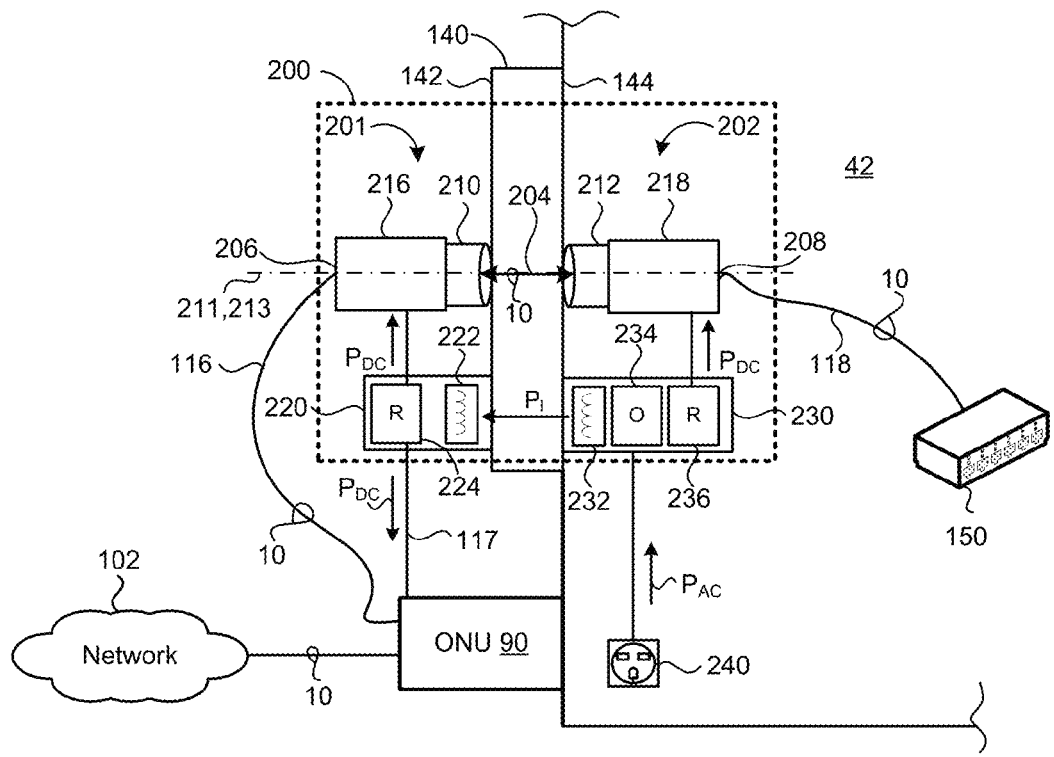
FIGS. 2A and 2B are schematic views of an example optical bridge of the network system of FIGS. 1A and 1B.

Referring to FIG. 2A, in some implementations, the first optical terminal 201 also includes an optical transmitter/receiver (transceiver) 216 configured to transmit/receive optical signals 10 to and from the second optical terminal 202 via the wireless optical link 204. In the example shown, the optical transceiver 216 is optically coupled to the first fiber port 206 and the output lens 210. The optical transceiver 216 may receive a downstream optical signal 10 routed through the first residential optical fiber 116 to the first fiber port 206. The transceiver 216 may operate in a transmit mode for transmitting downstream optical signals 10 through the substantially transparent surface 140 to the second optical terminal 202. In some examples, the transceiver 216 includes a laser for transmitting the optical signal 10 to the output lens 210. In other examples, the transceiver 216 includes a light emitting diode (LED) for transmitting the optical signal 10 to the output lens 210. The output lens 210 receives the transmitted optical signal 10 from the transceiver 216 and directs the optical signal 10 through the wireless optical link 204 to the second optical terminal 202.

In some implementations, the second optical terminal 202 also includes a corresponding optical transmitter/receiver (transceiver) 218 configured to transmit/receive optical signals 10 to and from the first optical terminal 201 via the wireless optical link 204. In the example shown, the optical transceiver 218 is optically coupled to the input lens 212 and the second fiber port 208. In some examples, the optical transceiver 218 at the second optical terminal 202 receives upstream optical signals 10 intended for the provider network 102 from the NIU 150 and routed through the second residential optical fiber 118 to the second fiber port 208. In these examples, the optical transceiver 218 may operate in a transmit mode for transmitting the upstream optical signals 10, 10u through the substantially transparent surface 140 to the first optical terminal 201. The optical transceiver 218 may include a laser or a light emitting diode for transmitting the upstream optical signal 10 through the window 140 to the first optical terminal 201.

The customer premises equipment (CPE) including the ONU 90 and optical bridge 200 may connect to a power source (e.g., a 120 Volt Alternating Current (VAC)) for powering components associated with the CPE. For instance, power energizes a light source (e.g., laser or LED) of the first optical transceiver 216 at the first optical terminal 201 (and/or the second optical transceiver 218 at the second optical terminal 202) while in the transmit mode for transmitting the optical signal 10 through the substantially transparent surface 140 via the wireless optical link 204. The ONU 90 located outside the building 42 may also use power for energizing a corresponding optical transceiver (e.g., antennas) for transmitting/receiving optical beams 114 to and from the FSO terminal 112. In some examples, first optical terminal 201 and/or the ONU 90 located on the outside of the building 42 connect to an external power source (e.g., a weatherproof 120 VAC outlet). However, external power sources are often absent, or are inconveniently located and therefore require the use of long cable runs to provide power to the CPEs 90, 201.

With continued reference to FIG. 2A, in some implementations, the first optical terminal 201 includes power circuitry 220 configured to receive power wireless from an internal charging device 230 located inside the building 42 for power components, such as the optical transceiver 216 of the first optical terminal 201. The second optical terminal 202 affixed to the internal side 144 of the window 140 may implement the internal charging device 230. In some examples, the power circuitry 220 is inductively coupled to the internal charging device 230 and receives inductive power Pi through the surface 140 (e.g., window) of the building 42 from the internal charging device 230. For instance, the charging device 230 may include a transmit induction coil 232 configured to generate an electromagnetic field for transmitting the inductive power Pi through the surface 140 of the building 42, while the power circuitry 220 at the first optical terminal 201 on the exterior of building 42 may include a receive induction coil 222 configured to receive the inductive power Pi. In some implementations, the charging device 230 is electrically connected to an alternating current (AC) power source 240 (e.g., a 120 VAC wall outlet) located inside the building 42. The charging device 230 may receive AC power PAC from the AC power source 240 and use an oscillator 234 to convert the PAC to desirable high-frequency waves for use by the transmit induction coil 232 when transmitting the inductive power Pi through the surface 140 to the receive induction coil 222. While the example shown includes the electromagnetic field transmitting the inductive power Pi through the substantially transparent surface 140 (e.g., window), the inductive power Pi may transmit through other surfaces, including opaque surface such as walls, doors, or facades.

In some examples, the internal charging device 230 of the second optical terminal 202 is affixed to the interior surface 144 of the building 42 in a juxtaposed relationship with the power circuitry 220 of the first optical terminal 201 affixed to the exterior surface 142 of the building 42. However, in other examples, the internal charging device 230 and the power circuitry 220 may affix to opposite sides of other surfaces, such as doors or walls, as long as the output and input lenses 210 and 212 affix to the opposite sides of the substantially transparent surface 140 to establish the wireless optical link 204 therebetween. Positioning the power circuitry 220 and the charging device 230 on opposite sides 142 and 144 of the surface 140 in the juxtaposed relationships permits the power circuitry 220 of the first optical terminal 201 and the charging device 230 of the second optical terminal 202 to inductively couple to one another for transferring the inductive power Pi through the surface 140 from the charging device 230 to the power circuitry 220. Moreover, the subscribing end user 40 may install the charging device 230 by simply affixing the second optical terminal 202 to the interior surface 144 of the building 42 and connecting the charging device 230 to the power source 240.

The power circuitry 220 at the first optical terminal 201 affixed to the external side 142 of the surface 140 may further include a rectifier 224 configured to convert the inductive power $P_I$ received by the receive induction coil 222 to direct current power $P_{DC}$. The direct current power $P_{DC}$ may energize the receive induction coil 222. In some examples, the power circuitry 220 is electrically connected to the optical transceiver 216 and provides the direct current power $P_{DC}$ to the optical transceiver 216 for powering the light source (e.g., laser or LED) when the transceiver 216 operates in the transmit mode. Additionally or alternatively, the power circuitry 220 may provide direct current power $P_{DC}$ to the ONU 90 for powering components thereof. For instance, the power circuitry 220 may electrically connect to the ONU 90 via a cable 117 for routing the direct current power $P_{DC}$ to the ONU 90. In some examples, the internal charging device 230 optionally includes a rectifier 236 for converting the alternating current power $P_{DC}$ received from the power source 240 to a direct current power $P_{DC}$ for powering the second optical transceiver 218 of the second optical terminal 202.

Figure 2B:
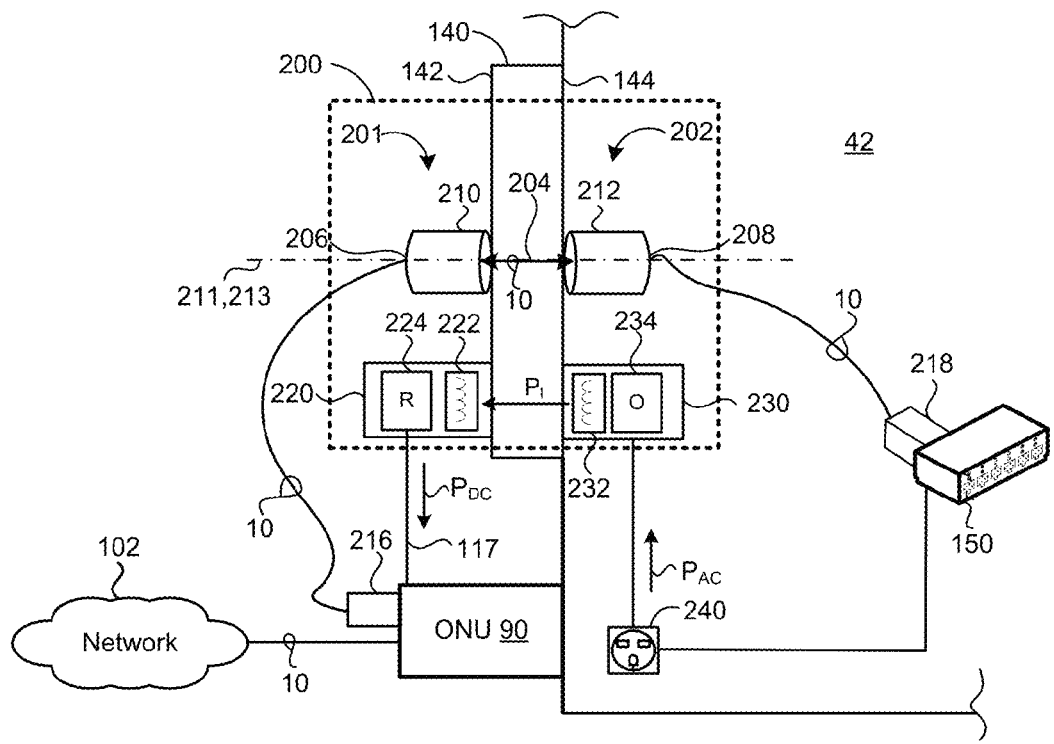

Referring to FIG. 2B, in other implementations, the first optical transceiver 216 is implemented at the ONU 90, rather than at the first optical terminal 201. Here, the optical transceiver 216 is operative in the transmit mode to transmit downstream optical signals 10 received from the provider network 102 through the first residential optical fiber 116 to the output lens 210 of the first optical terminal 201. The output lens 210 may direct the transmitted optical signal 10 through the wireless optical link 204 to the second optical terminal 202. In the example shown, the first optical terminal 201 implements the power circuitry 220 and the second optical terminal 202 implements the charging device 230. Here, the receive induction coil 222 of the power circuitry 220 inductively couples to the transmit induction coil 232 for receiving the inductive power Pi transmitted through the building 42 via the electromagnetic field. The rectifier 224 may then convert the inductive power Pi to the direct current power $P_{DC}$ and the power circuitry 220 may route the direct current power $P_{DC}$ via cable 117 to the optical transceiver 216 at the ONU 90 for powering the light source (e.g., laser or LED) when the transceiver 216 operates in the transmit mode.

Additionally or alternatively, the second optical transceiver 218 may be implemented at the NIU 150 instead of at the second optical terminal 202. Here, the second optical transceiver 218 is operative in the transmit mode to transmit upstream optical signals 10 through the second residential optical fiber 118 to the second optical terminal 202 for transmission through substantially transparent surface 140. The second optical transceiver 218, as well as the NIU 150, may receive power directly from the power source 240. In some examples, the second optical transceiver 218 is implemented at the NIU 150, as shown in FIG. 2B, while the first optical transceiver 216 is implemented at the first optical terminal 201, as shown in FIG. 2A. In other examples, the first optical transceiver 216 is implemented at the ONU 90, as shown in FIG. 2B, while the second optical transceiver 218 is implemented at the second optical terminal 202, as shown in FIG. 2A.

The OLT 20 transmits the optical signal 10 through the optical network 102 to a target ONU 90 associated with an intended end user 40. Over long stretches of optical fiber 12, optical power levels associated the optical signals 10 traveling therethrough gradually dissipate and often require amplification to reach CPEs, such as the network interface unit 150 of the intended end user 40. For instance, implementing the light source (e.g., laser or LED) of the optical transceiver 216 at the first optical terminal 201 (FIG. 2A) or at the ONU 90 (FIG. 2B) upstream of the first optical terminal 201 is operative to amplify the optical signal 10 for transmission to the second optical terminal 202 over the wireless optical link 204. Thereafter, the NIU 150 may receive the optical signal 10 with sufficient optical power for conversion to electrical signals and delivery to one or more target electronic devices 120 within the residential network 104 via the wireless connections 122 and/or the wired connections 124.

Figure 3:
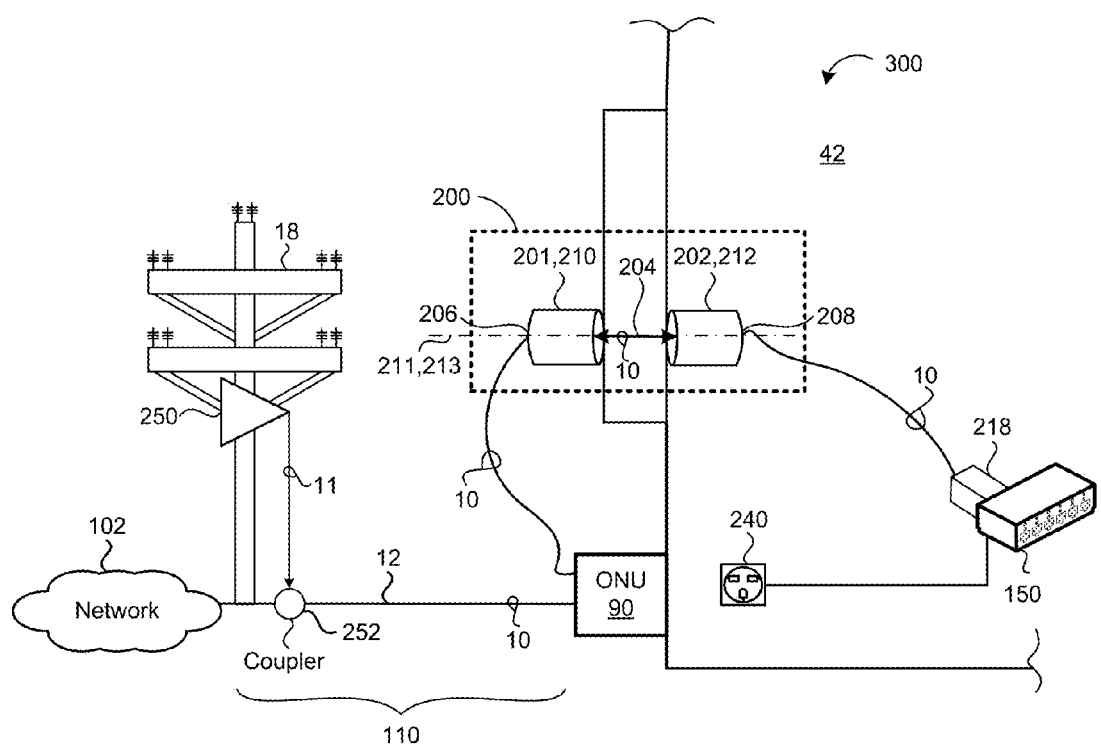
FIG. 3 is a schematic view of an example optical amplifier pumping light into an optical fiber to amplify a downstream optical signal traveling from an optical line terminal within an external network to an optical network unit within a residential network.

Referring to FIG. 3, in some implementations, schematic view 300 shows the optical network (e.g., external network/provider network) 102 including an optical amplifier 250 configured to amplify an optical signal (e.g., light signal) 10 traveling through an optical fiber 12. The optical amplifier 250 may be optically coupled to the last-run portion 110 (e.g., last mile) of optical fiber 12 feeding the premises (e.g., building) 42 of the target end user 40. The optical fiber amplifier 250 advantageously allows the optical signal 10 to be amplified without having to first convert the optical signal 10 into an electrical signal. In the example shown, the optical amplifier 250 is disposed at, and receives power from, a power line 18 along the last-run portion 110. The optical amplifier 250 pumps light signals 11 into the optical fiber 12 to amplify the optical signal 10 before the ONU 90 at the demarcation point receives the optical signal 10. In some examples, optical amplifier 250 amplifies the optical signal 10 to achieve an optical power sufficient for transmission through the wireless optical link through the substantially transparent surface 140 of the building 42. The optical amplifier 250 may be used in lieu of, or in addition to, the first optical transceiver 216 at the first optical terminal 201 (FIG. 2B) or at the ONU 90.

In some examples, the optical amplifier 250 is an Erbium Doped Fiber Amplifier (EDFA) where the amplifier 250 transmits a high-powered beam of pump light 11 that mixes with the optical signal 10 at an optical coupler 252. In some examples, the optical coupler 252 is a wavelength selective coupler. The optical fiber 12 may be doped with erbium ions to receive the mixed optical signal 10 and pump light 11, and thereby amplify the optical signal 10. In some examples, the optical amplifier 250 is operative to only amplify downstream optical signals 10. While an EDFA optical amplifier 250 is shown, other examples may include an Erbium Doped Waveguide Amplifier that uses a waveguide to boost the optical signal 10.

Figure 4:
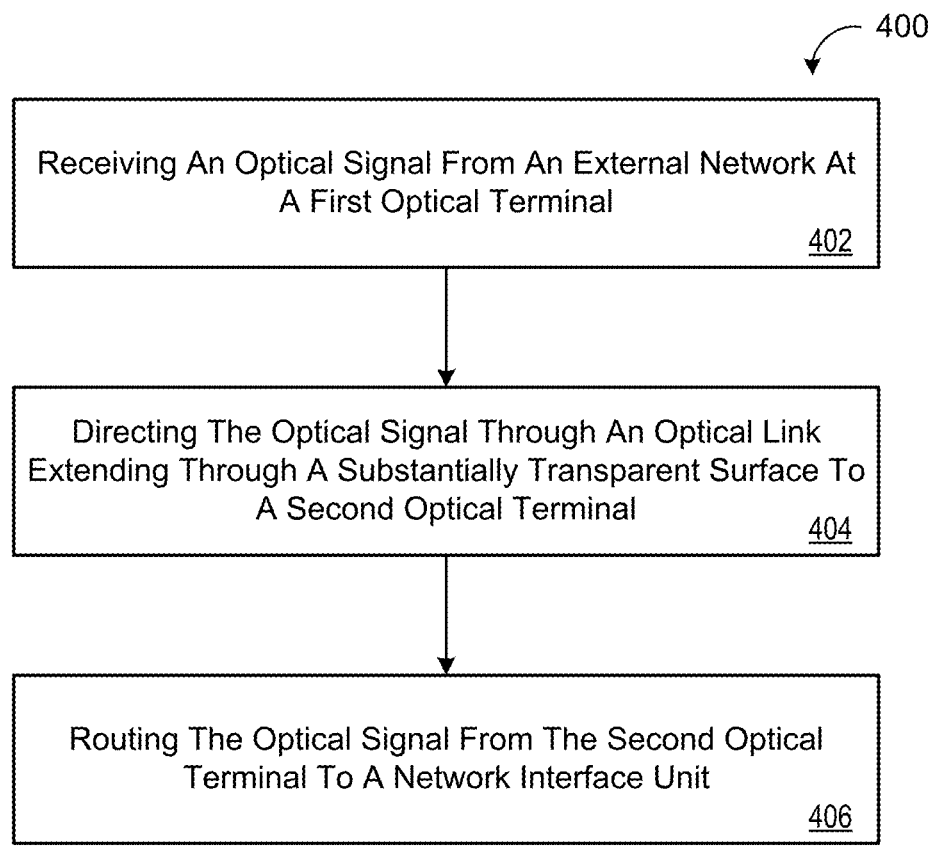
FIG. 4 is a flowchart of an example method for non-intrusively establishing communication between an optical line terminal within an external network and a network interface unit within a residential network.

FIG. 4 provides an example arrangement of operations for a method 400 of non-intrusively establishing communication between an optical line terminal (OLT) 20 within an external network 102 and a network interface unit (e.g., network box) 150 within a residential network 104. The external network 102 may include a passive optical network (PON). At block 402, the method 400 includes receiving an optical signal 10 from the external network 102 at a first optical terminal 201 affixed to an external side 142 of a substantially transparent surface 140 of a building 42. The first optical terminal 201 is associated with an optical bridge 200 and includes a first fiber port 206 configured to receive a first residential optical fiber 216. The first residential optical fiber 216 is configured to route the optical signal 10 from the external network 102 to the first optical terminal 201. The first optical terminal 201 also includes an output lens 210 optically coupled to the first fiber port 206 and defining an optical transmission axis 211.

At block 404, the method 400 also includes directing, by the output lens 210 of the first optical terminal 201, the optical signal 10 through an optical link 204 extending through the substantially transparent surface 140 to a second optical terminal 202 of the optical bridge 200. The second optical terminal 202 is affixed to an interior side 144 of the substantially transparent surface 140 and includes an input lens 212 optically coupled to the output lens 210 of the first optical terminal 201 and a second fiber port 208 optically coupled to the input lens 212. The substantially transparent surface 140 may include a glass window. Here, the glass window 140 provides the transmission medium for the wireless optical link 204 to penetrate without having to route physical fibers through the building 42. Additionally, the optical link 204 may include a distance equal to a thickness of the glass window. For instance, the optical link 204 may define a distance within the range from about an eighth of an inch (1/8") to about one inch (1").

The input lens 212 is configured to receive the optical signal 10 from the first optical terminal 201 through the optical link 204. In some examples, the input lens 212 defines an optical receiving axis 213 substantially coaxial with the optical transmission axis 211 of the output lens 210. The second fiber port 208 is configured to receive a second residential optical fiber 118 to the network interface unit (NIU) 150 located within the building 42. At block 406, the method 400 also includes routing the optical signal 10 from the second optical terminal 201 to the NIU 150 via the second residential optical fiber 118.

In some examples, the first optical terminal 201 receives the optical signal 10 through the first residential optical fiber 116 from an optical network unit (ONU) 90 located outside the building 42 at a demarcation point between the building 42 and the external network 102. The ONU 90 is configured to route the optical signal 10 from the OLT 20 of the external network 102 to the first optical terminal 201 of the optical bridge 200. The ONU 90 may receive the optical signal 10 through a fiber optic line 12 terminating at the ONU 90. In some examples, the fiber optic line 12 is optically coupled to an optical amplifier 250 at a coupler 252. The optical amplifier 250 configured to pump light 11 into the fiber optic line 12 to amplify the optical signal 10. The ONU 90 may receive the optical signal 10 via a free space optical beam 114 from a free space optical terminal 112 at an established fiber point of presence site of the external network 102. Moreover, the ONU 90 may include an optical transceiver 216 configured to transmit the optical signal 10 received from the external network 102 through the first residential optical fiber 116 to the output lens 210 of the first optical terminal 201.

In some implementations, prior to the output lens 210 directing the optical signal 10 through the optical link 204, an optical transceiver 216 at the first optical terminal 201 receives the optical signal 10 routed through the first residential optical fiber 116 to the first fiber port 206. Here, the optical transceiver 216 is optically coupled to the first fiber port 206 and the output lens 210. The optical transceiver 216 may include a light source (e.g., laser or LED) configured to transmit the optical signal 10 to the output lens 210. The output lens 210 then directs the transmitted optical signal 10 through the optical link 204.

The first optical terminal 201 may include power circuitry 220 configured to receive inductive power Pi from an internal charging device 230 inductively coupled to the power circuitry 220. The second optical terminal 202 may implement the interior charging device 230. Thus, the internal charging device 230 is located inside the building 42. The internal charging device 230 includes a transmit induction coil 232 configured to generate an electromagnetic field for transmitting the inductive power Pi through the substantially transparent surface 140 to the power circuitry 220 of the first optical terminal 201. The power circuitry 220 of the first optical terminal 201 may include a receive induction coil 222 configured to receive the inductive power Pi, and a rectifier 224 configured to convert the inductive power Pi into direct current power $P_{DC}$ for powering the optical transceiver 216 of the first optical terminal 201 and/or power CPE (e.g., the ONU 90) located outside the building 42.

In some examples, the NIU 150 of the residential network 104 is configured to convert the optical signal 10 received from the second optical terminal 202 into an electrical signal containing packets of data 50 from the external network 102. Thereafter, the NIU 150 may transmit the data packets 50 through the residential network 104 to one or more electronic devices 120 located inside the building 42. In some examples, the NIU 150 uses multiple-user multiple-input multiple-output (MU-MIMO) beam forming configured to transmit/receive data packets 50 to and from multiple electronic devices 120 having spatially diverse locations within the building 42.

Figure 5:
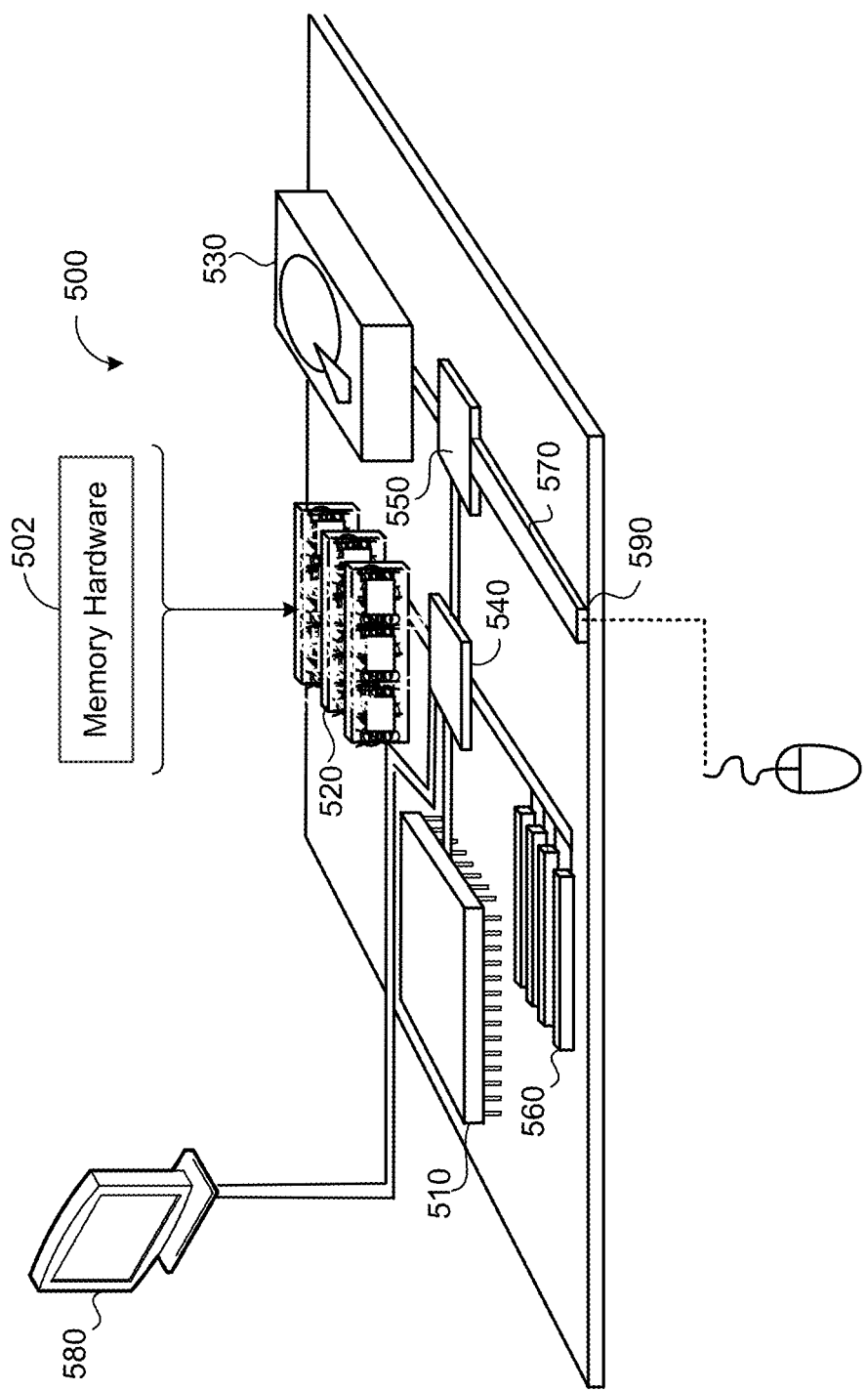
FIG. 5 is schematic view of an example computing device that may be used to implement the systems and methods described in this document.

FIG. 5 is a schematic view of an example control hardware 500 in communication with memory hardware 502 that may be used to implement the systems and methods described in this document. The control hardware 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The control hardware 500 includes a processor 510, memory 520, a storage device 530, a high-speed interface/controller 540 connecting to the memory 520 and high-speed expansion ports 560, and a low speed interface/controller 550 connecting to low speed bus 570 and storage device 530. Each of the components 510, 520, 530, 540, 550, and 560, are interconnected using various busses, and may be mounted on a common motherboard or in other manners as appropriate. The processor 510 can process instructions for execution within the control hardware 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple control hardware 500 may be connected, with each device providing portions of the necessary operations (e.g., as a server bank, a group of blade servers, or a multi-processor system).

The memory 520 stores information non-transitorily within the control hardware 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the control hardware 500, while the low speed controller 550 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 550 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The control hardware 500 may be implemented in a number of different forms, as shown in the figure. For example, it may be implemented as a standard server or multiple times in a group of such servers, as a laptop computer, or as part of a rack server system. The control hardware 500 may implement the first and second optical terminals 201, 202, respectively, of the optical bridge 200. The control hardware 500 may be in communication with the memory hardware 502.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
    receiving an optical signal from an external network at a first optical terminal affixed to an external side of a substantially transparent surface of a building, the first optical terminal comprising:
        a first fiber port configured to receive a first end of a first optical fiber, the first optical fiber having a second end received by an optical network unit and configured to route the optical signal from the optical network unit to the first optical terminal, the optical network unit located outside the building at a demarcation point between the building and the external network; and
        an output lens optically coupled to the first fiber port and defining an optical transmission axis; and
    directing, by the output lens of the first optical terminal, the optical signal through an optical link extending through the substantially transparent surface to a second optical terminal affixed to an interior side of the substantially transparent surface without converting the optical signal into another form, the second optical terminal comprising:
        an input lens optically coupled to the output lens of the first optical terminal and configured to receive the unconverted optical signal from the first optical terminal through the optical link; and
        a second fiber port optically coupled to the input lens and configured to receive a second optical fiber connecting the second optical terminal to a network interface unit located within the building, the second optical fiber configured to route the unconverted optical signal from the second optical terminal to the network interface unit.

2. The method of claim 1, wherein the input lens defines an optical receiving axis substantially coaxial with the optical transmission axis of the output lens.

3. The method of claim 1, wherein the optical network unit is configured to route the optical signal from an optical line terminal of the external network to the first optical terminal via the first optical fiber.

4. The method of claim 1, further comprising, prior to directing the optical signal through the optical link:
    receiving, at an optical transceiver of the first optical terminal, the optical signal routed through first optical fiber from the optical network unit to the first fiber port, the optical transceiver optically coupled to the first fiber port and the output lens; and
    transmitting the optical signal from the optical transceiver to the output lens.

5. The method of claim 1, further comprising receiving, at power circuitry of the first optical terminal, inductive power from an internal charging device inductively coupled to the power circuitry, the internal charging device located inside the building and comprising a transmit induction coil configured to generate an electromagnetic field for transmitting the inductive power through the substantially transparent surface to the power circuitry.

6. The method of claim 1, wherein the network interface unit is configured to:
    convert the unconverted optical signal received from the second optical terminal into an electrical signal, the electrical signal containing packets of data from the external network; and
    transmit the data packets through a residential network to an electronic device located inside the building.

7. The method of claim 1, wherein the substantially transparent surface comprises a window.

8. The method of claim 1, wherein the optical link comprises a distance equal to a thickness of the substantially transparent surface.

9. The method of claim 3, wherein the optical network unit receives the optical signal through a fiber optic line terminating at the optical network unit.

10. The method of claim 3, wherein the optical network unit receives the optical signal via a free space optical beam from a free space optical terminal at an established fiber point of presence site of the external network.

11. The method of claim 3, wherein the optical network unit comprises an optical transceiver configured to transmit the optical signal received from the external network through the first optical fiber to the output lens of the first optical terminal.

12. The method of claim 5, wherein the internal charging device is electrically connected to an alternating current power source located inside the building and affixed to the interior side of the substantially transparent surface in a juxtaposed relationship with the external network interface unit.

13. The method of claim 5, wherein the power circuitry of the first optical terminal comprises:
    a receive induction coil configured to receive the inductive power transmitted over the electromagnetic field by the transmit induction coil of the internal charging device; and
    a rectifier configured to convert the inductive power into direct current power for powering an optical transceiver of the first optical terminal and/or powering customer premises equipment located outside the building.

14. The method of claim 6, wherein the network interface unit uses multiple-user multiple-input multiple-output beam forming configured to transmit/receive data packets to and from multiple electronic devices having spatially diverse locations within the building.

15. The method of claim 9, wherein the fiber optical line is optically coupled to an optical amplifier configured to pump light into the fiber optic line to amplify the optical signal.

16. A system comprising:
    a network interface unit located within a building;
    an optical network unit located outside the building at a demarcation point between the building and an external network;

a first optical terminal configured to receive an optical signal from the external network, the first optical terminal affixed to an external side of a substantially transparent surface of the building and comprising:
- a first fiber port configured to receive a first end of a first optical fiber, the first optical fiber having a second end received by the optical network unit and configured to route the optical signal from the optical network unit to the first optical terminal; and
- an output lens optically coupled to the first fiber port and defining an optical transmission axis, the output lens configured to direct the optical signal through an optical link extending through the substantially transparent surface without converting the optical signal into another form; and a second optical terminal affixed to an interior side of the substantially transparent surface, the second optical terminal comprising:
- an input lens optically coupled to the output lens of the first optical terminal and configured to receive the unconverted optical signal from the first optical terminal through the optical link; and
- a second fiber port optically coupled to the input lens and configured to receive a second optical fiber connecting the second optical terminal to the network interface unit, the second optical fiber configured to route the unconverted optical signal from the second optical terminal to the network interface unit.

17. The system of claim 16, wherein the input lens defines an optical receiving axis substantially coaxial with the optical transmission axis of the output lens.

18. The system of claim 16, wherein the optical network unit is configured to route the optical signal from an optical line terminal of the external network to the first optical terminal via the first optical fiber.

19. The system of claim 16, wherein the first optical terminal comprises an optical transceiver optically coupled to the first fiber port and the output lens, the first optical terminal configured to:
- receive the optical signal routed through first optical fiber from the optical network unit to the first fiber port; and
- transmit the optical signal from the optical transceiver to the output lens.

20. The system of claim 16, further comprising:
an internal charging device located inside the building and inductively coupled to power circuitry of the first optical terminal, the internal charging device comprising a transmit induction coil configured to generate an electromagnetic field for transmitting inductive power through the substantially transparent surface to the power circuitry.

21. The system of claim 16, wherein the network interface unit is configured to:
- convert the unconverted optical signal received from the second optical terminal into an electrical signal, the electrical signal containing packets of data from the external network; and
- transmit the data packets through a residential network to an electronic device located inside the building.

22. The system of claim 16, wherein the substantially transparent surface comprises a window.

23. The system of claim 16, wherein the optical link comprises a distance equal to a thickness of the substantially transparent surface.

24. The system of claim 18, wherein the optical network unit receives the optical signal through a fiber optic line terminating at the optical network unit.

25. The system of claim 18, wherein the optical network unit receives the optical signal via a free space optical beam from a free space optical terminal at an established fiber point of presence site of the external network.

26. The system of claim 18, wherein the optical network unit comprises an optical transceiver configured to transmit the optical signal received from the external network through the first optical fiber to the output lens of the first optical terminal.

27. The system of claim 20, wherein the internal charging device is electrically connected to an alternating current power source located inside the building and affixed to the interior side of the substantially transparent surface in a juxtaposed relationship with the external network interface unit.

28. The system of claim 20, wherein the power circuitry of the first optical terminal comprises:
- a receive induction coil configured to receive the inductive power transmitted over the electromagnetic field by the transmit induction coil of the internal charging device; and
- a rectifier configured to convert the inductive power into direct current power for powering an optical transceiver of the first optical terminal and/or powering customer premises equipment located outside the building.

29. The system of claim 21, wherein the network interface unit uses multiple-user multiple-input multiple-output beam forming configured to transmit/receive data packets to and from multiple electronic devices having spatially diverse locations within the building.

30. The system of claim 24, further comprising an optical amplifier optically coupled to the fiber optical line, the optical amplifier configured to pump light into the fiber optic line to amplify the optical signal.

* * * * *